United States Patent
Rao et al.

(10) Patent No.: US 9,356,870 B2
(45) Date of Patent: May 31, 2016

(54) CONTENTION HANDLING IN SMP BASED NETWORKS

(71) Applicant: Infinera Corp., Annapolis Junction, MD (US)

(72) Inventors: Rajan Rao, Fremont, CA (US); Satyajeet Ahuja, Cupertino, CA (US); Biao Lu, Saratoga, CA (US)

(73) Assignee: Infinera Corporation, Sunnyvale, CA (US)

( * ) Notice: Subject to any disclaimer, the term of this patent is extended or adjusted under 35 U.S.C. 154(b) by 61 days.

(21) Appl. No.: 14/042,055

(22) Filed: Sep. 30, 2013

(65) Prior Publication Data

US 2014/0355424 A1 Dec. 4, 2014

Related U.S. Application Data

(60) Provisional application No. 61/830,902, filed on Jun. 4, 2013.

(51) Int. Cl.
| | |
|---|---|
| *H04L 12/24* | (2006.01) |
| *H04L 12/801* | (2013.01) |
| *H04J 14/02* | (2006.01) |
| *H04L 12/703* | (2013.01) |
| *H04L 12/851* | (2013.01) |

(52) U.S. Cl.
CPC ............. *H04L 47/12* (2013.01); *H04J 14/0295* (2013.01); *H04L 45/28* (2013.01); *H04L 47/2433* (2013.01)

(58) Field of Classification Search
CPC .................................................... H04J 14/0295
See application file for complete search history.

(56) References Cited

U.S. PATENT DOCUMENTS

| | | | | |
|---|---|---|---|---|
| 2005/0243711 | A1* | 11/2005 | Alicherry et al. | 370/216 |
| 2008/0219272 | A1* | 9/2008 | Novello et al. | 370/401 |
| 2009/0034975 | A1* | 2/2009 | Sadananda | 398/79 |
| 2014/0247712 | A1* | 9/2014 | Cheung et al. | 370/228 |

\* cited by examiner

*Primary Examiner* — John Blanton
(74) *Attorney, Agent, or Firm* — Dunlap Codding P.C.; David L. Soltz

(57) ABSTRACT

Nodes and methods are disclosed for protection and restoration in the event of multiple failures for multiple paths involved for the same service in shared mesh networks, including, a method comprising the steps of storing, in non-transitory memory of a first node in a shared mesh network having a plurality of connections through the shared mesh network, records of global contention handling priority values of the plurality of connections; detecting a first signal from a second node requesting activation of a first connection of the plurality of connections, and a second signal from a third node requesting activation of a second connection of the plurality of connections, the first and second connections having overlapping requirements; determining that the second connection has a higher global contention handling priority value than the first connection based at least in part on the records; and activating the second connection.

18 Claims, 6 Drawing Sheets

CONTENTION HANDLING IN SMP BASED NETWORKS

INCORPORATION BY REFERENCE

The present patent application claims priority to Provisional Patent Application U.S. Ser. No. 61/830,902 titled CONTENTION HANDLING IN SMP BASED NETWORKS, filed on Jun. 4, 2013, the entire contents of which are hereby expressly incorporated herein by reference.

FIELD OF THE DISCLOSURE

The disclosure generally relates to methods and apparatuses for contention handling in transport networks. More particularly the disclosure relates to methodologies for contention handling, protection and restoration in the event of multiple failures for multiple paths involved for the same service in shared mesh networks. Though the methodologies set forth herein are in the context of traffic engineering (TE) routing in optical transport networks (OTN), such methodologies may be applied to any transport network that utilize protection and recovery provisioning utilizing shared resources.

BACKGROUND

Traffic Engineering (TE) is a technology that is concerned with performance optimization of operational networks. In general, Traffic Engineering includes a set of applications mechanisms, tools, and scientific principles that allow for measuring, modeling, characterizing and control of user data traffic in order to achieve specific performance objectives.

A switched network usually includes multiple switch nodes (also referred to as "nodes") which are connected by communication links and arranged in a topology referred to in the art as a "mesh network". Within the mesh network, user traffic can be transported between any two locations using predefined connections specifying particular links and/or switch nodes for conveying the user traffic. Shared Mesh Protection (SMP) is a common protection and recovery mechanism in mesh networks, where multiple paths can share the same set of network resources (such as bandwidth or timeslots) for protection purposes. Mesh networks utilizing Shared Mesh Protection may be referred to as shared mesh networks.

The switch nodes in the mesh network are each provided with a control module. The control modules of the switch nodes function together to aid in the control and management of the mesh networks. The control modules can run a variety of protocols for conducting the control and management of the mesh networks. One prominent protocol is referred to in the art as "Generalized Multiprotocol Label Switching (GMPLS)".

Generalized Multiprotocol Label Switching (GMPLS) is a type of protocol which extends multiprotocol label switching to encompass network schemes based upon time-division multiplexing (e.g. SONET/SDH, PDH, G.709), wavelength multiplexing, and spatial switching (e.g. incoming port or fiber to outgoing port or fiber). Multiplexing, such as time-division multiplexing is when two or more signals or bit streams are transferred over a common channel.

Generalized Multiprotocol Label Switching includes multiple types of label switched paths including protection and recovery mechanisms which specifies predefined (1) working connections within a mesh network having multiple nodes and communication links for transmitting data between a headend node and a tailend node; and (2) protecting connections specifying a different group of nodes and/or communication links for transmitting data between the headend node to the tailend node in the event that one or more of the working connections fail. Working connections may also be referred to as working paths. Protecting connections may also be referred to as recovery paths and/or protecting paths and/or protection paths. A first node of a path may be referred to as a headend node or a source node. A last node of a path may be referred to as a tailend node or end node or destination node. The headend node or tailend node initially selects to receive data over the working connection (such as an optical channel data unit label switched path) and then, when a working connection fails, the headend node or tailend node selects a protecting connection for passing data within the mesh network. The set up and activation of the protecting connections may be referred to as restoration or protection. Protection mechanisms, where network resources act as backup for working connections, have been in use for some time. However, when multiple paths and multiple failures are involved for the same service, systems may be slowed by contention for resources. When multiple source nodes attempt to activate paths that use the same network resources, a contention for resources may occur. Typically in a contention situation, the node receiving the multiple activation requests for connections of the same network priority rejects all of the activation requests and the source nodes must wait and reattempt activation after a delay. This results in slower switching times and delayed delivery of data traffic.

Systems and methods are needed for deterministic implementation of contention handling, in order to decrease switching times, and increase network speed, reliability, and resilience.

SUMMARY

A method and system are disclosed. The problem of inadequate mechanisms for addressing contention handling for activation of paths in contention for resources in shared mesh networks is addressed through methods and systems utilizing Global Contention Handling Priorities for service differentiation.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

Figure 1:
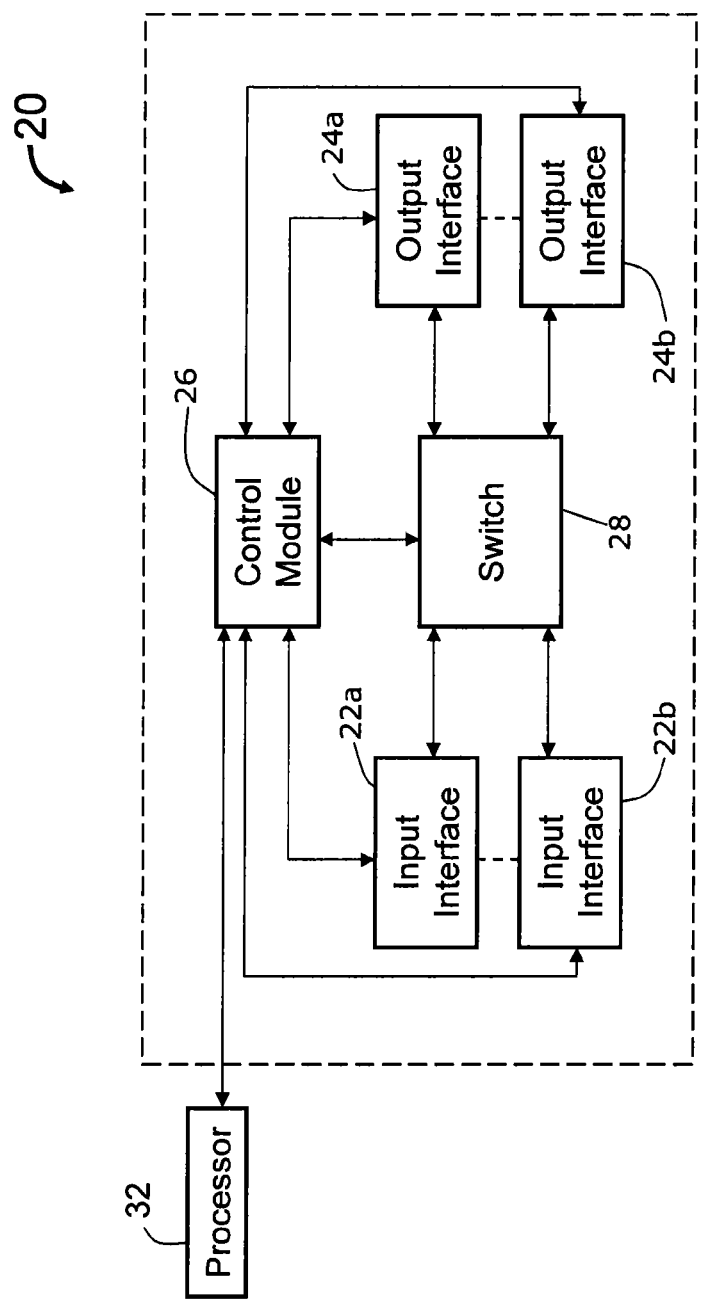
FIG. 1 is a block diagram of an exemplary node constructed in accordance with the present disclosure for communicating via a mesh network.

The following detailed description refers to the accompanying drawings. The same reference numbers in different drawings may identify the same or similar elements.

The mechanisms proposed in this disclosure circumvent the problems described above. The present disclosure describes methods and systems for storing, in non-transitory memory of a first node in a shared mesh network having a plurality of connections through the shared mesh network, records of global contention handling priority values of the plurality of connections; detecting, by circuitry of the first node, a first signal from a second node requesting activation of a first connection of the plurality of connections, and a second signal from a third node requesting activation of a second connection of the plurality of connections, the first and second connections having overlapping requirements; determining, with circuitry of the first node, that the second connection has a higher global contention handling priority value than the first connection based at least in part on the records; and activating, with circuitry of the first node, the second connection.

In one embodiment, the step of storing includes storing second records of network priority values of the plurality of connections, and wherein the step of determining, from the first records, with circuitry of the first node, that the second connection has a higher global contention handling priority value than the first connection, further comprises determining from the second records that the first and second connections have a same network priority value In one embodiment, the method further comprises determining, with circuitry of the first node, availability of the requirements of the second connection, including that the first connection has not been activated from beginning to end of the first connection.

In one embodiment, the system and method further comprise transmitting to the second node, with circuitry of the first node, a rejection signal indicative of failure to allocate the requirements for the first connection.

In one embodiment, prior to storing the second records, the method may further comprise receiving, when the first and second connections are created and prior to activation of the first and second connections, with circuitry of the first node, the global contention handling priority values of the first and second connections.

In one embodiment, the global contention handling priority values may be assigned globally to the plurality of connections. The global contention handling priority values may be provided by a network administration station. In one embodiment, the global contention handling priority values for the first and second connections are generated locally by the second and third nodes, respectively.

In one embodiment, a node may have at least one or more input interface, one or more output interface, one or more non-transitory memory, and one or more control module controlling the input interface, the output interface, and the non-transitory memory, the control module adapted to store, in the non-transitory memory, records of global contention handling priority values of a plurality of connections through a shared mesh network; detect a first signal from a second node requesting activation of a first connection of the plurality of connections, and a second signal from a third node requesting activation of a second connection of the plurality of connections, the first and second connections having overlapping requirements; determine that the second connection has a higher global contention handling priority value than the first connection based at least in part on the records; and transmit at least one of a third signal from the output interface to activate the second connection.

In one embodiment, the records are first records, and the control module may be adapted to store second records of network priority values of the plurality of connections, and the control module may be adapted to determine, from the first records, that the second connection has a higher global contention handling priority value than the first connection and determine from the second records that the first and second connections have a same network priority value.

In one embodiment, the control module is adapted to determine availability of the requirements of the second connection, including that the first connection has not been activated from beginning to end of the first connection.

In one embodiment, the control module is further adapted to transmit from the output interface a rejection signal to the second node indicative of failure to allocate the requirements for the first connection.

In one embodiment, the control module is further adapted to receive, through the input interface, when the first and second connections are created and prior to activation of the first and second connections, the global contention handling priority values of the first and second connections.

In one embodiment, the global contention handling priority values are assigned globally to the plurality of connections. The global contention handling priority values may be provided by a network administration station. In one embodiment, the global contention handling priority values for the first and second connections are generated locally by the second and third nodes, respectively.

DEFINITIONS

If used throughout the description and the drawings, the following short terms have the following meanings unless otherwise stated:

APS stands for Automatic Protection Switching.

GMPLS stands for Generalized Multi-Protocol Label Switching which extends Multi-Protocol Label Switching to encompass time-division (for example, SONET/SDH, PDH, G.709), wavelength (lambdas), and spatial multiplexing (e.g., incoming port or fiber to outgoing port or fiber). The GMPLS framework includes a set of routing protocols which runs on a control module. The Generalized Multiprotocol Label Switching architecture is defined, for example in RFC 3945.

IETF stands for Internet Engineering Task Force. The Internet Engineering Task Force (IETF) is a volunteer group dedicated to improving the Internet by proposing uniform standards for data transfer protocols, among other things. The IETF has recently extended GMPLS to allow for the transmission of more data through an Optical Transport Network (OTN). The IETF publishes Requests for Comment (RFC) detailing proposed standard protocols.

IP stands for Internet Protocol which is a protocol used for communicating data across a packet-switched internetwork using the Internet Protocol Suite, also referred to as TCP/IP.

LSP stands for Label Switched Path which is a path through a Generalized Multi-Protocol Label Switching network. Note that Label Switched Paths can be bidirectional or unidirectional; they enable packets to be label switched through the Multiprotocol Label Switched network from a port on an ingress node (which can be called a headend node) to a port on an egress node (which can be called a tailend node).

MPLS stands for multi-protocol label switching which is a scheme in telecommunications networks for carrying data from one node to the next node. MPLS operates at an OSI model layer that is generally considered to lie between traditional definitions of layer 2 (data link layer) and layer 3 (network layer) and is thus often referred to as a layer 2.5 protocol.

OAM stands for Operation, Administration and Maintenance.

OTN stands for Optical Transport Network which includes a set of optical switch nodes which are connected by optical fiber links. ITU-T recommendations G.709 and G.872 define OTN interface requirements and network architecture respectively.

TE stands for Traffic Engineering which is a technology that is concerned with performance optimization of operational networks. In general, TE includes a set of applications mechanisms, tools, and scientific principles that allow for measuring, modeling, characterizing and control of user data traffic in order to achieve specific performance objectives.

Network Priority refers to Setup & Holding priority as defined in RFC 3209, "RSVP-TE: Extensions to RSVP for LSP Tunnels", December 2001. In general, network priorities are assigned to connections in a shared mesh network and utilized to indicate which connections take precedent over other connections. In current standards, there are a limited number of network priority levels.

DESCRIPTION

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more and the singular also includes the plural unless it is obvious that it is meant otherwise.

Further, use of the term "plurality" is meant to convey "more than one" unless expressly stated to the contrary.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Figure 2:
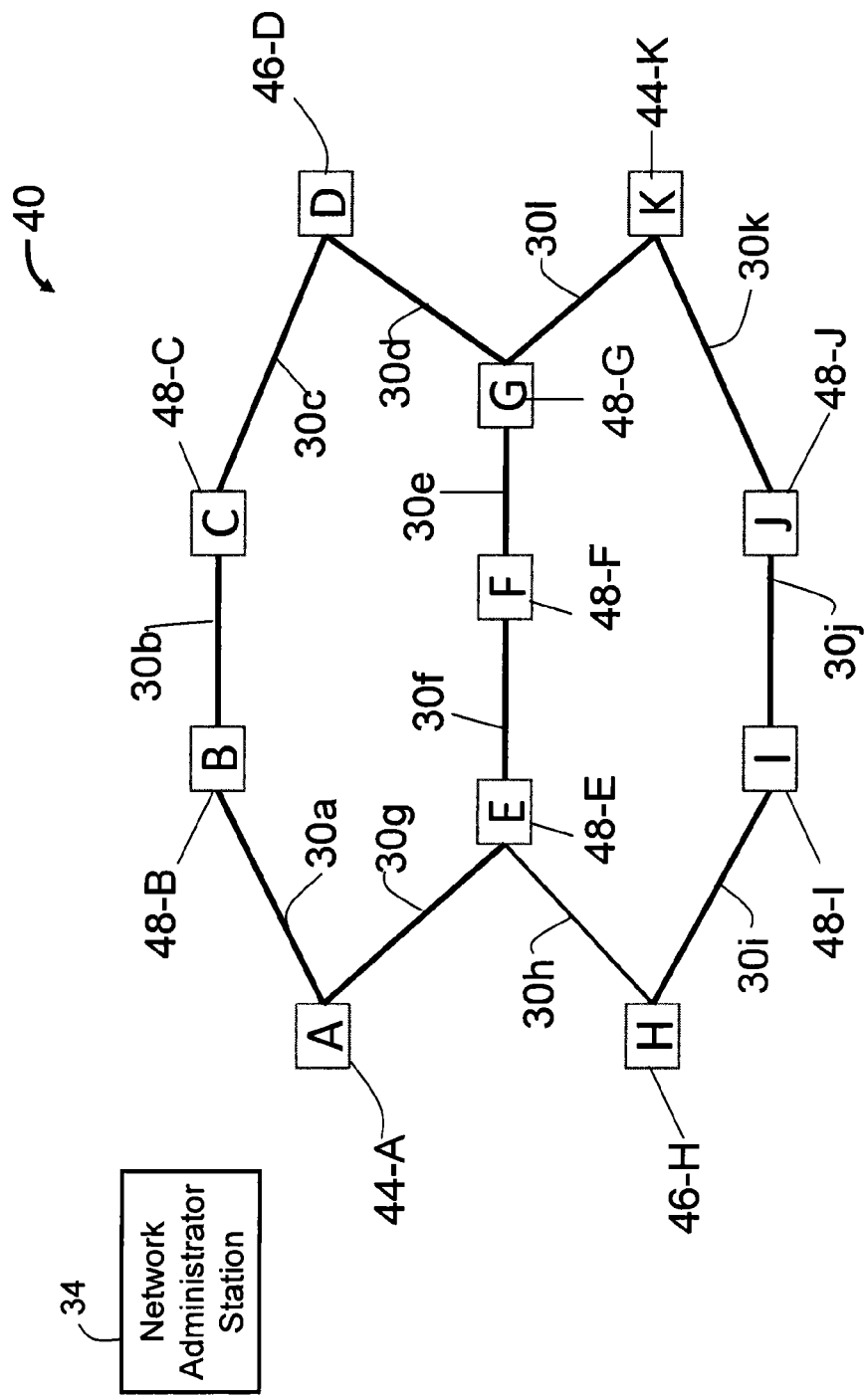
FIG. 2 is a schematic diagram of an exemplary mesh network.

Referring now to the drawings, and in particular to FIG. 1, shown therein and designated by reference numeral 20 is a block diagram of an exemplary node constructed in accordance with the present disclosure. The node 20 is adapted to facilitate the communication of data (which may be referred to herein as "traffic" and/or "data traffic") between multiple nodes 20 in a shared mesh network 40, as shown in FIG. 2. The shared mesh network 40 may be, for example, an optical transport network (OTN).

The node 20 is provided with one or more input interfaces 22, one or more output interfaces 24, a control module 26, and a switch 28. In general, the input interfaces, shown here as 22a and 22b, are adapted to receive traffic from the shared mesh network 40, and the output interfaces, shown here as 24a and 24b, are adapted to transmit traffic onto the shared mesh network 40 (see FIG. 2). The switch 28 serves to communicate the traffic from the input interfaces 22a and 22b, to the output interfaces 24a and 24b. And, the control module 26 serves to control the operations of the input interfaces 22a and 22b, the output interfaces 24a and 24b, and the switch 28, as well as to set up label switched paths within the shared mesh network 40. The node 20 may also include non-transitory memory (not shown), either within the control module 26 and/or the switch 28, or separate from the control module 26 and/or the switch 28.

The node 20 can be implemented in a variety of ways, including, commercial installations having one or more backplanes (not shown), racks, and the like. In this example, the input interface(s) 22, the output interface(s) 24, the control module 26 and the switch 28 are typically implemented as separate devices, which may have their own power supply, local memory and processing equipment. In another example, the node 20 can be implemented as a single device having a shared power supply, memory and processing equipment. Or, in another example, the node 20 can be implemented in a modular manner in which one or more of the input interface(s) 22, the output interface(s) 24, the control module 26 and the switch 28 share a power supply and/or housing.

The input interface(s) 22 and the output interface(s) 24 of one node 20 are adapted to communicate with corresponding input interface(s) 22, and output interface(s) 24 of another node 20 within the shared mesh network 40 via communication links 30, as shown in FIG. 2. An example of an input interface 22 and/or an output interface 24 is an Ethernet card or optical port. In general, each of the input interface(s) 22 and/or the output interface(s) 24 may have a unique logical identification, such as an IP address. The communication links 30 can be implemented in a variety of ways, such as a physical link including electrical (e.g., copper wire or coax) and/or optical signal (e.g., optical fiber or other waveguide) carrying capabilities, or as a wireless link. The communication links 30 can be fiber optic cables, electronics cables, wireless communication links, or the like.

The implementation of the input interface(s) 22, and the output interface(s) 24 will depend upon the particular type of communication link 30 that the particular input interface 22 and/or output interface 24 is designed to communicate with. For example, one of the input interfaces 22 can be designed to communicate wirelessly with another node 20 within the shared mesh network 40, while one of the output interfaces 24 of the node 20 can be designed to communicate optically through a fiber-optic link. For a particular node 20, the input interfaces 22a and 22b can be of the same type or different types; the output interfaces 24a and 24b can be of the same type or different types; and the input interface(s) 22 and output interface(s) 24 can be of the same type or different types.

In accordance with the present disclosure, messages transmitted between the nodes 20 can be processed by circuitry within the input interface(s) 22, and/or the output interface(s) 24 and/or the control module 26. Circuitry could be analog and/or digital, components, or one or more suitably programmed microprocessors and associated hardware and software, or hardwired logic. Also, certain portions of the implementations have been described as "components" that perform one or more functions. The term "component," may include hardware, such as a processor, an application specific integrated circuit (ASIC), or a field programmable gate array (FPGA), or a combination of hardware and software. Software includes one or more computer executable instructions that when executed by one or more component cause the component to perform a specified function. It should be understood that the algorithms described herein are stored on one or more non-transient memory. Exemplary non-transient memory includes random access memory, read only memory, flash memory or the like. Such non-transient memory can be electrically based or optically based. Further, the messages described herein may be generated by the components and result in various physical transformations.

The input interface 22 and the output interface 24 are shown separately for purposes of clarity. However, it should be understood that one or more of the input interfaces 22 and/or the output interfaces 24 could be connected to a single communication link 30 and implemented as a single device, such as a line module. Exemplary line modules and nodes are described in U.S. Pat. No. 8,223,803 (Application Publication number 20090245289), entitled "Programmable Time Division Multiplexed Switching," the entire contents of which are hereby incorporated herein by reference. Further, it should be understood that the node can be implemented in a variety of manners.

In one embodiment, one or more processor 32 may be used externally to the source node 20. The processor 32 may be any suitable processor 32 and may be located externally to node 20 and/or shared mesh network 40. One example of a suitable processor 32 is a processor in a network management station/network administrator station 34 (as shown in FIG. 2). However, it should be understood that the processor 32 may be located anywhere. The processor 32 may execute instructions that cause the processor 32 to perform the methods described herein. The information produced by the processor 32 may be stored in non-transitory memory (not shown). The processor 32 may provide the information to the source node 20 through the control module 26.

A schematic diagram of an exemplary shared mesh network 40 is shown in FIG. 2, by way of example. In FIG. 2, the shared mesh network 40 includes nodes 20 labeled as A, B, C, D, E, F, G, H, I, J and K. Some of the nodes 20 are denoted as a headend node 44 (also known as a source node) or tailend node 46 (also known as a destination node) for a particular path in accordance to the path setup direction. Other nodes 20 are known as intermediate nodes 48. In this example, the shared mesh network 40 includes headend nodes 44-A and 44-K; tailend nodes 46-D and 46-H; and intermediate nodes 48-B, 48-C, 48-E, 48-F, 48-G, 48-I, and 48-J, connected by links 30a-30l.

Internal or external to the shared mesh network 40 may be one or more network administrator station 34 (also known as a network management station). The network administrator station 34 may have one or more processors 32 having one or more non-transitory memory (not shown). The network administrator station 34 may control aspects of the shared mesh network 40 and communicate with various network elements. The network administrator station 34 may also be referred to as a network controller.

Figure 3:
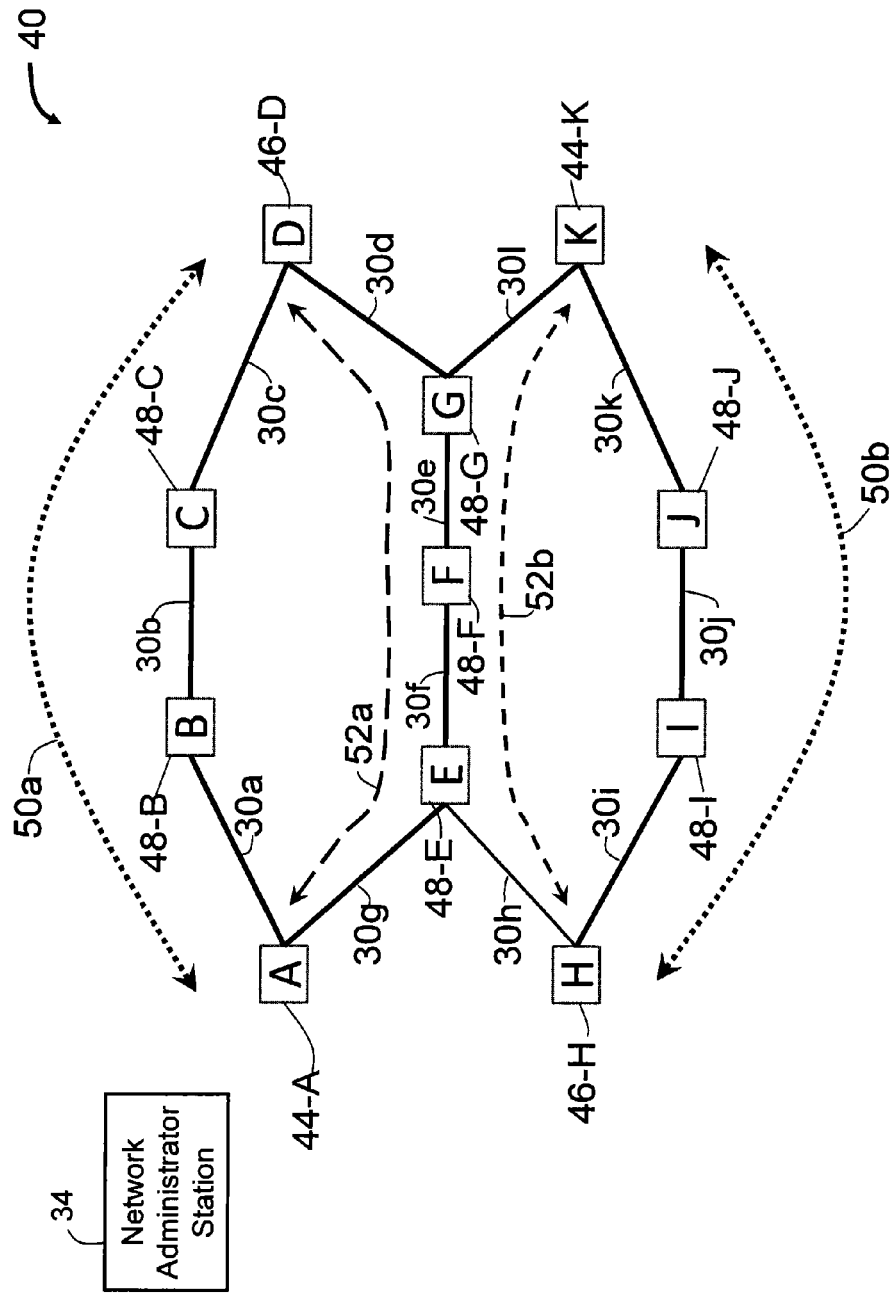
FIG. 3 is a schematic diagram of the mesh network of FIG. 2 showing working and protection paths within the mesh network.

In general, Shared Mesh Protection (SMP), as used herein, refers to a situation in which the headend node 44 or tailend node 46 sets up one or multiple protection paths 52 for a particular working path 50, as illustrated in FIG. 3. Each protection path 52 may reserve the timeslots on the intermediate nodes 48 of the protection path 52, but does not actually configure them until needed. The timeslots may be shared by multiple protection paths 52. Nodes 20 may have network topology information. Topology information may be determined by using standard topology discovery procedures.

The connections, such as working paths 50 and protection paths 52, may be configured using GMPLS protocols and/or the connections may be configured at individual nodes 20. The network administrator station 34 may configure the connections in the shared mesh network 40.

The headend node 44 or the tailend node 46 is responsible for detecting the failure of the working path 50. Once the headend node 44 or the tailend node 46 detects a defect in the working path 50, the headend node 44 or the tailend node 46 initiates recovery action by activating the corresponding protection path 52 with activation messages and redirecting user traffic onto the protection path 52. In general, each protection path 52 is likely established over a set of nodes 20 that are shared by multiple other working paths 50 and/or protection paths 52. The node 20 that initiates recovery action by activating the corresponding protection path 52 with activation messages may be referred to as the source node. The mechanisms used to detect the failure of the working path 50 are known to those in the art.

In one embodiment, circuitry of the source node 20 may generate signals comprising messages and transmit the signals through an output interface 24 of the source node 20 to an input interface 22 of one or more transit nodes 20 to set up the protection path(s) 52 in the mesh network 40. The messages may include instructions instructing the intermediate node(s) 48 of the protection path to reserve and/or share mesh network 40 resources for the protection path(s) 52. Messages may include instructions for configuring nodes 20, time slot information, multiplexing information, and the like.

Circuitry of the source node 20 may generate additional signals comprising additional messages and transmit the signals through the output interface 24 of the source node 20 to input interfaces 22 of the nodes 20 in the working paths 50 and the nodes 20 in the protection paths 52.

FIG. 3 illustrates the exemplary mesh network 40 depicted in FIG. 2 including two working paths 50a and 50b and two protection paths 52a and 52b. Thus, the first and second working paths 50a and 50b are formed by the communication links 30a-30c and nodes {44-A, 48-B, 48-C, 46-D}, and communication links 30k-30i and nodes {44-K, 48-J, 48-I, 46-H} respectively. The first and second protection paths 52a and 52b are formed by the communication links 30g, 30f, 30e, 30d, and nodes {44-A, 48-E, 48-F, 48-G, 46-D}, and communication links 30l, 30e, 30f, 30h, and nodes {44-K, 48-G, 48-F, 48-E, 46-H} respectively. Paths can be established via control planes prior to a failure of the mesh network 40.

In the example of FIG. 3, the intermediate nodes 48-E, 48-F, and 48-G, and the communication links 30e and 30f between intermediate nodes 48-E, 48-F, and 48-G, are shared by both the first and second protection paths 52a and 52b. The working paths 50a and 50b and the protection paths 52a and 52b can be established by the nodes 20 A-K prior to any network failure, for example, by using GMPLS protocols. The working paths 50 and the protection paths 52 may be uni-directional or bi-directional.

In general, in Shared Mesh Protection, both working paths 50a and 50b and protection paths 52a and 52b are setup initially. During setup, network resources, for example, nodes 20 A-K, communication links 30a-30l, and timeslots (not shown), are specified for each path. The first and second working paths 50a and 50b are activated with the appropriate resources on the intermediate nodes 48-B, 48-C, 48I, and 48-J; however, the first and second protection paths 52a and 52b may be reserved/informed but the resources on the intermediate nodes 48-E, 48-F, and 48G, will not be initially activated. Depending on network planning requirements, such as Shared Risk Link Group (SRLG), protection paths 52a, 52b may share the same set of resources on intermediate nodes 48-E, 48-F, and 48-G. The resource assignment may be a part of the control-plane Connection Admission Control (CAC) operation taking place on each node.

Upon detection of the first working path 50a failure (for example, if the communication link 30b between intermediate nodes 48-B and 48-C is cut), the edge node 20 (headend node 44-A and/or tailend node 46-D) will transmit a signal with activation messages to activate the first protection path 52a. By processing the activation messages, the intermediate nodes (48-E, 48-F, and 48-G) will program the switch fabric and configure the appropriate resources. Upon the completion of the activation, the user traffic is switched to the protection path 52a end to end.

However, if multiple working paths 50, for example, both the first and second working paths 50a and 50b, sustain failures within the same time period, contention handling is typically utilized. The term "contention" as used herein generally refers to the situation when node 20 receives activation requests to activate multiple connections having overlapping requirements, for example, bandwidth requirements. Typically, in a contention, the requests are received before any one of the multiple connections is established from end to end in the mesh network 40.

By way of example, upon detection of the first working path 50a failure, the edge node 20 (headend node 44-A and/or tailend node 46-D) will transmit a first signal with activation messages to activate the first protection path 52a. Similarly, upon detection of the second working path 50b failure, the edge node 20 (headend node 44-K and/or tailend node 46-H) will transmit a second signal with activation messages to activate the second protection path 52b. If the first and second signal arrive at one of the shared intermediate nodes 48-E, 48-F, 48-G in the protection paths 52a, 52b, before one of the requested protection paths 52a, 52b is initiated from the source node 44-A, 44-K, to the end node 46-D, 46-H, then the shared intermediate node 48 receiving the signal must determine which protection path 52a, 52b to activate.

Typically, in contention handling, the intermediate node 48 uses a connection network priority value to determine which protection path 52a, 52b is more important. However, there are a limited number of network priority values that can be assigned to the connections in the mesh network 40 according to current network standards, for example, as defined in RFC 3209, "RSVP-TE: Extensions to RSVP for LSP Tunnels". For example, there may be only eight priority values available. Therefore, protection paths 52a, 52b in contention for the same network resources may have the same network priority value. When the protection paths 52a, 52b have the same network priority value, the network 40 may take additional time to determine which protection path 52a, 52b to activate. For example, the node 20 receiving the multiple activation requests for connections of the same network priority may reject all of the activation requests to the source nodes 44. Then the source nodes 44 must wait and reattempt activation after a delay. To decrease the amount of time needed to determine which protection path 52a, 52b to activate and therefore, decrease the switching time from the working path 50 to the protection path 52 in the event of a failure, Global Contention Handling Priority (GCHP) may be utilized. Utilizing GCHP provides a deterministic method for the intermediate node 48 to resolve contentions such that the higher priority connection (of the connections attempting to use the shared resources) is activated. In one embodiment, use of GCHP may reestablish data traffic through the shared mesh network for the higher priority connection in less than approximately 50 milliseconds, thus providing faster network convergence to a stable state.

In one embodiment, Global Contention Handling Priority (GCHP) values are assigned to the connections in the mesh network 40. The GCHP values may be generated and assigned locally by the nodes 20 in the mesh network 40. For example, one of the nodes 20 may originate shared mesh protection (SMP) service and may generate the GCHP value. The GCHP values for the connection may be assigned/configured by the user. The GCHP value may be generated and assigned globally. For example, the GCHP value may be generated and assigned by an entity outside of the mesh network 40. In one example, the network administrator station 34 generates and assigns the GCHP values. The GCHP value may be assigned by an external management or planning tool, a SDN controller, or the like.

The node 20 that originates SMP service may also signal the GCHP values to the nodes 20 in the mesh network 40 during protecting path 52 creation. The intermediate nodes 48 in the mesh network 40 may create and store a record of the GCHP values in data structure of the intermediate nodes 48 in non-transitory memory. The intermediate nodes 48 may then utilize the GCHP values to resolve contention issues and determine which protection path 52a, 52b to activate in a contention situation. Again, in general, a contention issue occurs where a node 20 receives multiple activation messages for activation of multiple connections, such as protection paths 52a, 52b, in which one protection path 52a has network requirements, such as bandwidth, that overlaps the requirements of the other protection path 52b. Typically, contention occurs when neither protection path 52a, 52b has yet been activated from end-to-end of the protection path 52a, 52b in the mesh network 40.

The intermediate node 48 may first compare the network priority value of the protection paths 52a, 52b to determine priority. If the network priority value of the protection path 52a is the same as the network priority value of the protection path 52b, then the intermediate node 48 may compare the GCHP values of the protection paths 52a, 52b to determine which protection path 52a, 52b to activate.

In one example, the higher GCHP value may indicate a higher priority. However, it will be understood that other priority schemes may be used such as a lower GCHP value indicating a higher priority.

In one embodiment, the GCHP value may be unique for each connection, such as each working path 50a, 50b and each protection path 52a, 52b, in the mesh network 40. In one embodiment, the GCHP value may be a thirty-two bit digit.

In one embodiment, the intermediate node 48 may not consider the network priority values and may determine priority by the GCHP values without consideration of the network priority values.

Figure 4:
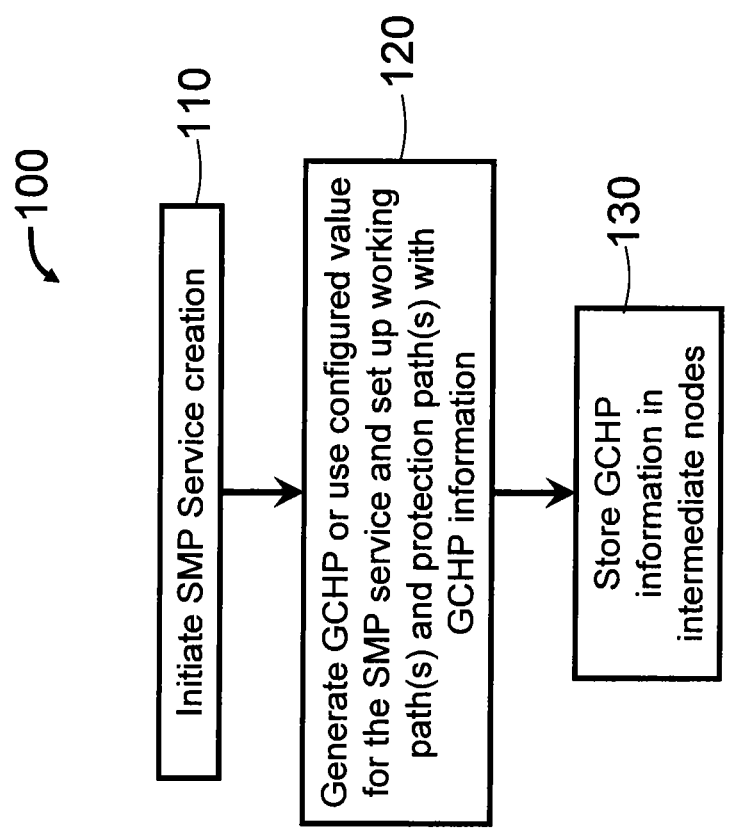
FIG. 4 is a flowchart depicting an exemplary initialization process for utilizing Global Contention Handling Priority in accordance with the present disclosure.

FIG. 4 is a flowchart depicting an exemplary initialization process 100 for utilizing GCHP in accordance with the present disclosure. In step 110 of the initialization process 100, the mesh network 40 initiates shared mesh protection service creation. In shared mesh protection service creation, nodes 20 in the mesh network 40 may negotiate and reserve protecting path(s) 52 prior to network failure. However, a data forwarding path will not be programmed until after detection of network failure when the nodes 20 send activation messages to activate the protection path(s) 52.

In step 120, the initialization process 100 generates GCHP values for the connections, such as working paths 50a, 50b, and protection paths 52a, 52b, in the mesh network 40. The GCHP values may be determined at the time the connections are set up for shared mesh protection, or at a later time. The GCHP values may be unique for each connection. The GCHP values may be generated locally, such as by one or more nodes 20, for example a shared mesh protection service originating node 20. The GCHP values may be generated globally, such as by a controller outside of the mesh network 40. In one example, the GCHP values are generated by the network administrator station 34. The GCHP value may be assigned by an external management or planning tool, a SDN controller, or the like. In one embodiment, the GCHP value may be a thirty-two bit digit. It will be understood that the GCHP value may be any size.

In step 130, the intermediate nodes 48 in the mesh network store the GCHP information, such as the GCHP values for connections in the mesh network 40. The GCHP information may be stored in non-transitory memory.

For example, returning to FIG. 3, during shared mesh protection initialization, the first and second protection paths 52a, 52b may be reserved and the first protection path 52a may be assigned a GCHP value of 100 and the second protection path 52b may be assigned a GCHP value of 200. The intermediate nodes 48, for example, intermediate nodes 48-E, 48-F, and 48-G, may store the GCHP values of the connections, including the GCHP values of the first and second protection paths 52a, 52b.

Figure 5:
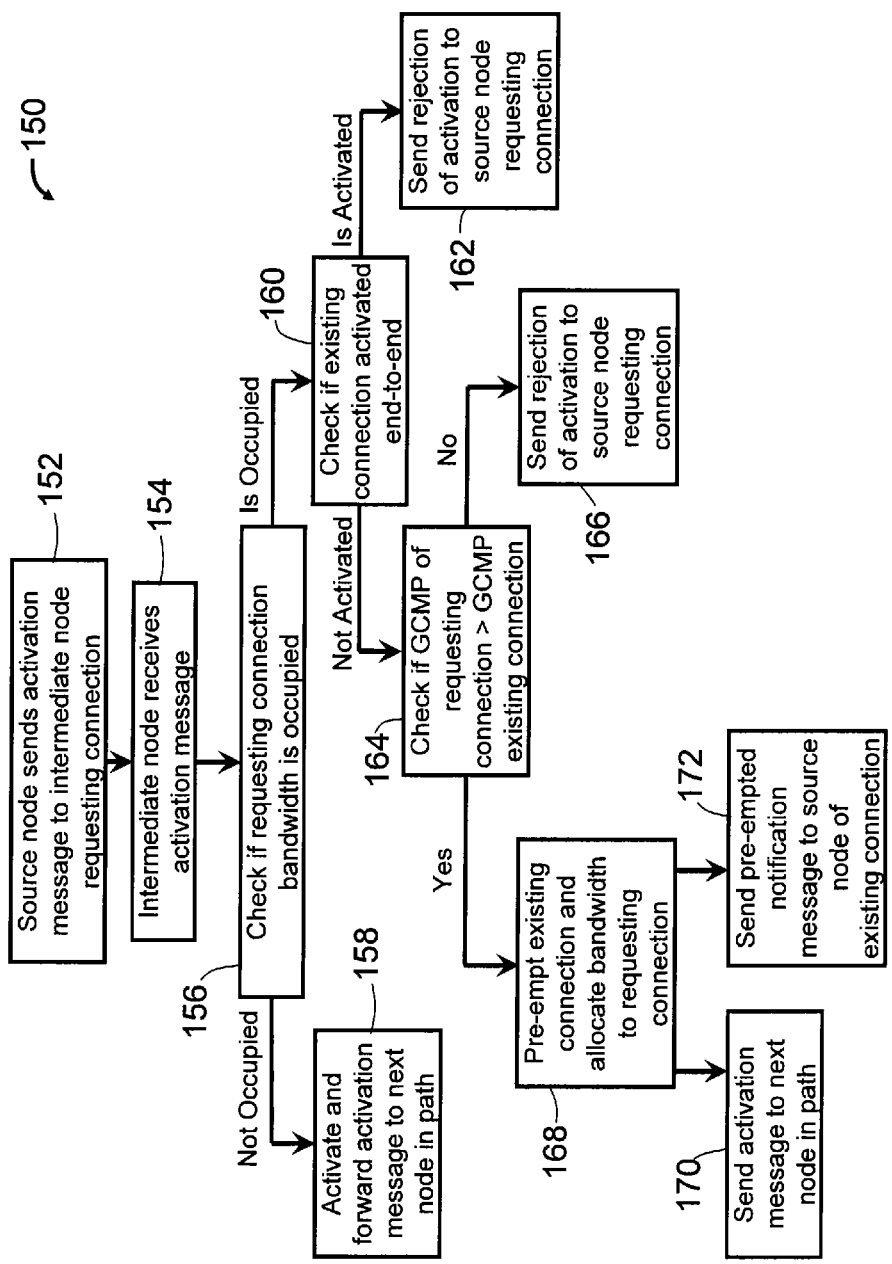
FIG. 5 is a process flow diagram of an exemplary Global Contention Handling Priority contention handling process.

FIG. 5 is a process flow diagram of an exemplary GCHP contention handling process 150 in relation to the exemplary mesh network 40 depicted in FIG. 3. In step 152, a failure has occurred in a connection, such as the first working path 50a, and the first source node 44-A of the first working path 50a sends an activation message to the intermediate node 48-E in the reserved first protection path 52a requesting that the first protection path 52a be activated. In step 154, the intermediate node 48-E receives the first activation message. In step 156, the intermediate node 48-E checks if the requirements needed for the first protection path 52a are available, for example, if the required bandwidth is unoccupied. If the resources are available, for example, the bandwidth is not occupied, then, in step 158, the intermediate node 48-E activates the first protection path 52a and forwards the activation message to the next node 20 (in this example, intermediate node 48-F) in the first protection path 52a.

However, if the required resources are not available, for example, the required bandwidth is occupied, then the GCHP contention handling process 150 moves to step 160 in which the intermediate node 48-E checks if the existing connection occupying the requested resources is activated from end-to-end of the connection (that is, if the existing connection is already fully transporting data traffic across the connection). If the existing connection is already activated end-to-end, then, in step 162 the intermediate node 48-E transmits a signal indicative of a rejection of activation to the first source node 44-A that requested the first protection path 52a be activated.

If the existing connection is not already activated end-to-end, then, in step 164, the intermediate node 48-E compares the GCHP value of the requested connection (for example, the first protection path 52a) to the GCHP value of the existing connection. If the GCHP value of the first protection path 52a is not greater than the GCHP value of the existing connection, then, in step 166, the intermediate node 48-E transmits a signal indicative of a rejection of activation to the first source node 44-A that requested the first protection path 52a be activated. If the GCHP value of the first protection path 52a is greater than the GCHP value of the existing connection, then, in step 168, the intermediate node 48-E pre-empts the existing connection and allocates the required resources, such as bandwidth, to the requesting connection, here, the first protection path 52a.

In step 170, the intermediate node 48-E transmits an activation message to the next node 20 in the requested connection, here, intermediate node 48-F in the first protection path 52a. In step 172, the intermediate node 48-E transmits a signal indicative of a message of notification of pre-emption to the source node 44 of the existing connection.

Figure 6:
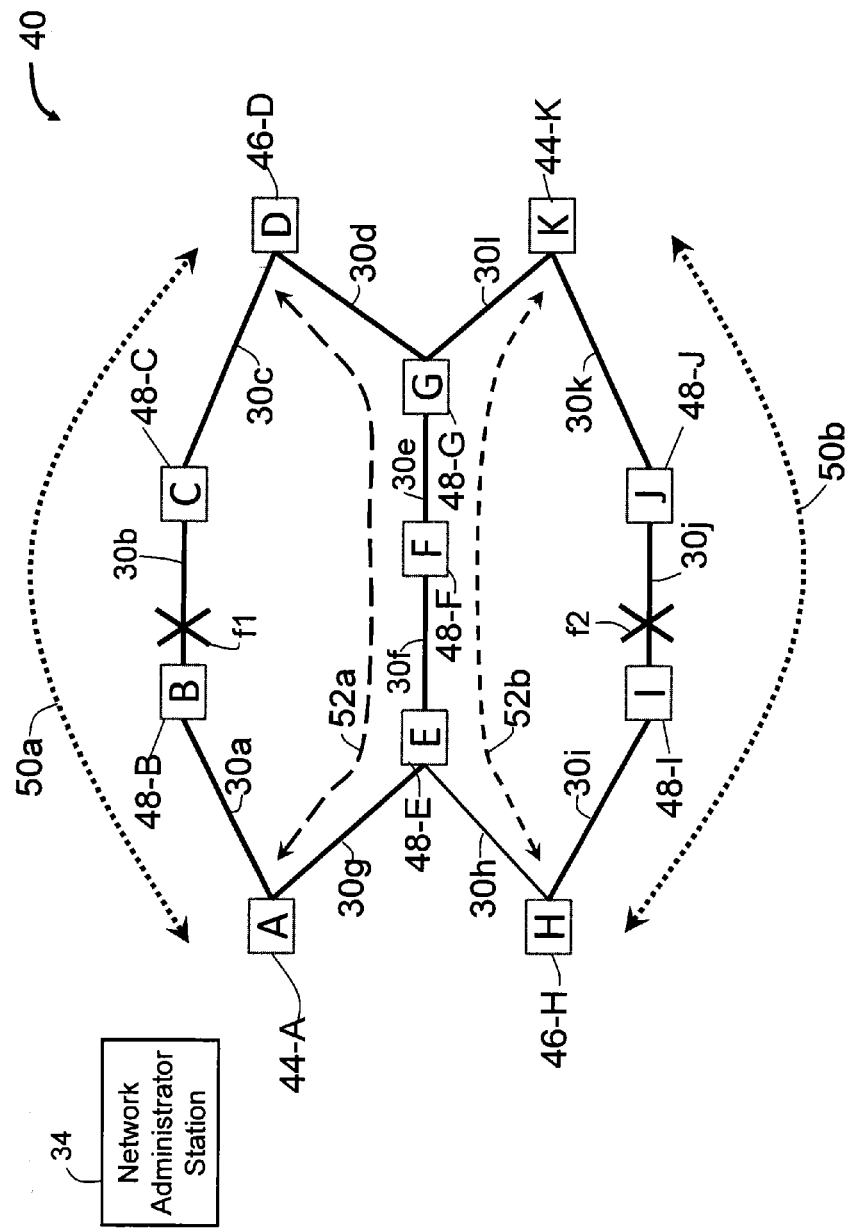
FIG. 6 is a schematic diagram of the exemplary mesh network of FIG. 2 having multiple failures.

By way of example, FIG. 6 is a schematic diagram of the exemplary mesh network 40 in which a first failure f1 (indicated by an "X") has occurred in the working path 50a and then a second failure f2 (indicated by an "X") has occurred in the working path 50b. For purposes of the example, node 20-K is designated as the headend node 44-K and node 20-H is designated as the tailend node 46-H for the second working path 50b and the second protection path 52b.

In this example, the first protection path 52a has been assigned a GCHP value of 100 and the second protection path 52b has been assigned a value of 200. After detection of the first failure f1, the source node 44-A of the first working path 50a attempts to activate the first protection path 52a by transmitting a first signal indicative of a first activation message to intermediate node 48-E. In response, intermediate node 48-E checks that the resources (such as bandwidth) required by the first protection path 52a are available and, if so, allows the first protection path 52a to take bandwidth on the communication link 30f.

However, after detection of the later second failure f2, the source node 44-K of the second working path 50b attempts to activate the second protection path 52b (which shares resources with the first protection path 52a) by transmitting a second signal indicative of a second activation message to intermediate node 48-G. Intermediate node 48-G may check if the first protection path 52a is already activated from end-to-end of the connection (that is, if the first protection path 52a is already fully transporting traffic across the connection). In this example, the first protection path 52a has not been activated end-to-end, so intermediate node 48-G then determines which GCHP value of the protection paths 52a, 52b has the greater priority. Since the second protection path 52b has a GCHP value of 200 and the first protection path 52a has a GCHP value of 100, the intermediate node 48-G determines that the second protection path 52b has a higher priority. The intermediate node 48-G may then pre-empt the first protection path 52a, allow the second protection path 52b to take bandwidth on the communication link 30f, and transmit a third signal indicative of the second activation message of the second protection path 52b to the next intermediate node 48-F. The intermediate node 48-G may transmit a fourth signal indicative of the pre-emption and rejection of the activation of the first protection path 52a to the first source node 44-A of the first working path 50a.

It will be understood that though the examples have been given in terms of two working paths 50a, 50b and two protection paths 52a, 52b, with a limited number of nodes 20, the concepts described herein may be applied to any number or size of working paths 50 and protection paths 52 in a shared mesh protection environment. Additionally, unidirectional and bidirectional protection are further described in RFC 4872, "RSVP-TE Extensions for E2E GMPLS Recovery" (May 2007).

CONCLUSION

Conventionally, dedicated and shared protection mechanisms for switching and reversion are not resilient or timely under multiple failure scenarios. In accordance with the present disclosure, methods, nodes, and systems are described in which Global Contention Handling Priority is implemented.

The foregoing description provides illustration and description, but is not intended to be exhaustive or to limit the inventive concepts to the precise form disclosed. Modifications and variations are possible in light of the above teachings or may be acquired from practice of the methodologies set forth in the present disclosure.

Further, while implementations have been described in the context of an optical network, this need not be the case. These implementations may apply to an electronic network using copper cabling, or even a wireless network. It should be understood that the methods described herein may be applied to any protection or protection scenario for any mesh network.

In addition, information regarding the label switched paths can be stored and processed in a distributed fashion, or in a centralized fashion. For example, time slot information for the different multiplexing levels within the multiplexing hierarchy can be stored in 'Generalized Label Object' in respective PSB and RSB control blocks (PSB represents 'PATH state' and RSB represents 'RESV state'). The time slot information can be stored in a distributed fashion (distributed storage having multiple memory/storage devices) and processed in a distributed manner preferably by using a hop-to-hop processing. In another implementation, the distributed storage may be replaced by a centralized memory that stores the time slot information for all, or a subset, of the nodes. In this situation, the nodes may include communication paths to obtain the connection information from the centralized memory.

One or more of the nodes 20 in the mesh network 40, and/or a network administrator station 34, may have or access network configuration data indicative of network topology information and/or may be provided network topology information. Information indicative of topology of the mesh network 40 may be stored on non-transitory memory. It should be understood that information indicative of topology of the mesh network 40 may be stored on non-transitory memory and retrieved by the source node 20. Topology information may be determined by using standard topology discovery procedures. One or more of the nodes 20 may save information indicative of the determined network topology, such as protection paths, and/or the GCHP values, in non-transitory memory.

In general, logical tables in one or more databases (not shown) may be used to support protection path 52 activation logic. Preferably, the tables include one or more connection tables, one or more logical timeslot tables, and one or more real timeslot tables. The connection table(s) maintains the connection-related information, including label, interfaces, and associated timeslot information for the connections. The logical timeslot table(s) is a timeslot translation table(s) between connections and timeslots. The real timeslot table(s) maintains the timeslot-related information, including the active connections that are currently conveying traffic and reserved connections for all timeslots. A reserved connection means there is not any active traffic on the timeslot. In the situation where the protection path 52 is identified in the connection table, the protection path's 52 associated timeslots can be readily discovered utilizing the logic timeslot table and the real timeslot table.

Even though particular combinations of features are recited in the claims and/or disclosed in the specification, these combinations are not intended to limit the disclosure. In fact, many of these features may be combined in ways not specifically recited in the claims and/or disclosed in the specification. Although each dependent claim listed below may directly depend on only one other claim, the disclosure includes each dependent claim in combination with every other claim in the claim set.

No element, act, or instruction used in the present application should be construed as critical or essential to the invention unless explicitly described as such outside of the preferred embodiment. Further, the phrase "based on" is intended to mean "based, at least in part, on" unless explicitly stated otherwise.

REFERENCES

The following references are hereby incorporated herein by reference:

RFC 2328, "OSPF Version 2," Moy, J., The Internet Society, April 1998.

RFC 3209, "RSVP-TE: Extensions to RSVP for LSP Tunnels", The Internet Society, Awduche et al., December 2001.

RFC 3473 "Generalized Multi-Protocol Label Switching (GMPLS) Signaling Resource ReserVation Protocol-Traffic Engineering (RSVP-TE) Extensions," Berger (Ed.), The Internet Society, January 2003.

RFC 3945, Mannie, E., "Generalized Multi-Protocol Label Switching (GMPLS) Architecture", October 2004.

RFC 4379, "Detecting Multi-Protocol Label Switched (MPLS) Data Plane Failures," Kombella, K. and Swallow, G., The Internet Society, February 2006.

RFC 4872, "RSVP-TE Extensions for E2E GMPLS Recovery," J. P. Lang, Y. Rekhter, D. Papadimitriou, The Internet Society, May 2007.

RFC 4873, "GMPLS Segment Recovery," L. Berger et al, The Internet Society, May 2007.

G.709-v3 ITU-T, "Interfaces for the Optical Transport Network (OTN)", G.709 Recommendation, December 2009.

G.872 ITU-T, "Architecture of optical transport networks", November 2001.

What is claimed is:

1. A method comprising the steps of:

storing, in non-transitory memory of a first node in a shared mesh network having a plurality of connections through the shared mesh network, first records of global contention handling priority values of the plurality of connections and second records of network priority values of the plurality of connections;

detecting, by circuitry of the first node, a first signal from a second node requesting activation of a first connection of the plurality of connections, and a second signal from a third node requesting activation of a second connection of the plurality of connections, the first and second connections having overlapping requirements;

determining, with circuitry of the first node, that the second connection has a higher global contention handling priority value than the first connection based at least in part on the first records and determining from the second records that the first and second connections have a same network priority value; and activating, with circuitry of the first node, the second connection.

2. The method of claim 1, further comprising determining, with circuitry of the first node, availability of the requirements of the second connection, including that the first connection has not been activated from beginning to end of the first connection.

3. The method of claim 1, further comprising the step of:
preempting, by circuitry of the first node, the first connection.

4. The method of claim 1, further comprising:
transmitting to the second node, with circuitry of the first node, a rejection signal indicative of failure to allocate the requirements for the first connection.

5. The method of claim 1, wherein, prior to storing the first records, the method further comprises:
receiving, with circuitry of the first node, when the first and second connections are created and prior to activation of the first and second connections, the global contention handling priority values of the first and second connections.

6. The method of claim 1, wherein the global contention handling priority values are assigned globally to the plurality of connections.

7. The method of claim 6, wherein the global contention handling priority values are assigned globally to the plurality of connections by a network management station.

8. The method of claim 1, wherein the global contention handling priority values for the first and second connections are generated locally by the second and third nodes, respectively.

9. The method of claim 1, wherein the steps of determining, with circuitry of the first node, that the second connection has a higher global contention handling priority value than the first connection based at least in part on the first records and activating, with circuitry of the first node, the second connection, occur within 50 milliseconds.

10. A node, comprising:
one or more input interface;
one or more output interface;
one or more non-transitory memory; and
one or more control module controlling the input interface, the output interface, and the non-transitory memory, the control module adapted to:
store, in the non-transitory memory, first records of global contention handling priority values of a plurality of connections through a shared mesh network;
detect a first signal from a second node requesting activation of a first connection of the plurality of connections, and a second signal from a third node requesting activation of a second connection of the plurality of connections, the first and second connections having overlapping requirements;
determine that the second connection has a higher global contention handling priority value than the first connection based at least in part on the first records; and
transmit at least one of a third signal from the output interface to activate the second connection,
wherein the control module is adapted to store second records of network priority values of the plurality of connections, and wherein the control module is adapted to determine, from the first records, that the second connection has a higher global contention handling priority value than the first connection and determine from the second records that the first and second connections have a same network priority value.

11. The node of claim 10, wherein the control module is adapted to determine availability of the requirements of the second connection, including that the first connection has not been activated from beginning to end of the first connection.

12. The node of claim 10, wherein the control module is adapted to preempt the first connection.

13. The node of claim 10, wherein the control module is further adapted to:
transmit from the one or more output interface a rejection signal to the second node indicative of failure to allocate the requirements for the first connection.

14. The node of claim 10, wherein the control module is further adapted to:
receive, through the one or more input interface, when the first and second connections are created and prior to activation of the first and second connections, the global contention handling priority values of the first and second connections.

15. The node of claim 10, wherein the global contention handling priority values are assigned globally to the plurality of connections.

16. The node of claim 10, wherein the global contention handling priority values are assigned globally to the plurality of connections by a network management station.

17. The node of claim 10, wherein the global contention handling priority values for the first and second connections are generated locally by the second and third nodes, respectively.

18. The node of claim 10 wherein the control module is adapted to determine that the second connection has a higher global contention handling priority value than the first connection based at least in part on the first records; and
transmit at least one of a third signal from the output interface to activate the second connection, within 50 milliseconds.

* * * * *